United States Patent [19]

Lay

[11] Patent Number: 5,324,061

[45] Date of Patent: Jun. 28, 1994

[54] GOOSENECK HITCH APPARATUS

[76] Inventor: Larry L. Lay, 869 Paradise Valley, Shoshoni, Wyo. 82649

[21] Appl. No.: 88,379

[22] Filed: Jul. 9, 1993

[51] Int. Cl.[5] ............................................ B60D 1/07
[52] U.S. Cl. .................................. 280/417.1; 280/511; 280/441.2
[58] Field of Search ............... 280/415.1, 416.1, 417.1, 280/425.1, 425.2, 407.1, 511, 512, 513, 483, 490.1, 441.2, 901

[56] References Cited

U.S. PATENT DOCUMENTS

| | | | |
|---|---|---|---|
| 3,527,476 | 9/1970 | Winkler | 280/441.2 |
| 3,650,546 | 3/1972 | Koenig | 280/901 |
| 3,796,444 | 3/1974 | Hixon | 280/483 |
| 3,810,661 | 5/1974 | Lowrance | 280/417.1 |
| 3,815,936 | 6/1974 | Oaks, Jr. | 280/417.1 |
| 3,840,252 | 10/1974 | Jacoy | 280/417.1 |
| 3,876,674 | 4/1975 | Jenkins | 280/417.1 |
| 3,889,978 | 6/1975 | Kam | 280/417.1 |
| 4,077,650 | 3/1978 | Leach, Jr. | 280/901 |
| 4,082,168 | 4/1978 | Cole et al. | 280/901 |
| 4,176,853 | 12/1979 | Brock | 280/901 |
| 4,261,594 | 4/1981 | Corbett et al. | 280/417.1 |

Primary Examiner—Margaret A. Focarino
Assistant Examiner—Kevin Hurley
Attorney, Agent, or Firm—E. Michael Combs

[57] ABSTRACT

A gooseneck hitch structure is arranged in accommodating a trailer with a conventional bumper hitch to a gooseneck type mount in a "fifth wheel" arrangement relative to an associated tow vehicle.

4 Claims, 4 Drawing Sheets

FIG. 5
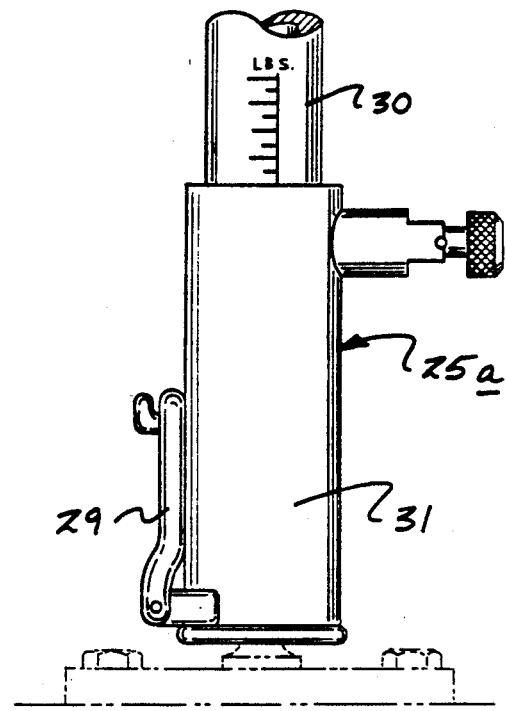
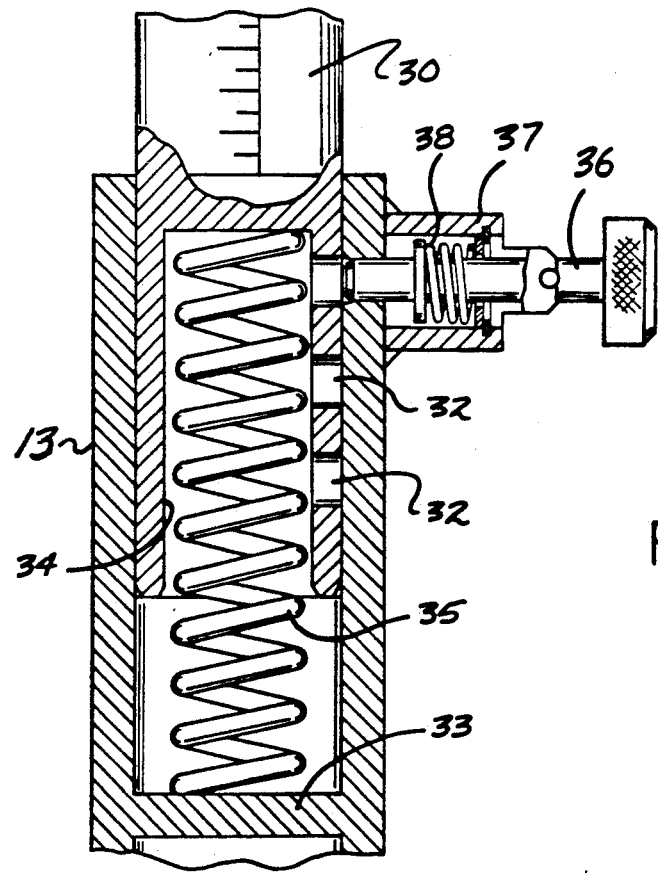
FIG. 6

GOOSENECK HITCH APPARATUS

BACKGROUND OF THE INVENTION

1. Field of the Invention

The field of invention relates to hitch apparatus, and more particularly pertains to a new and improved gooseneck hitch apparatus wherein the same is arranged for the adapting of a bumper hitch trailer relative to a gooseneck type mounting arrangement.

2. Description of the Prior Art

Gooseneck trailers of various types are utilized in the prior art and indicated by U.S. Pat. Nos. 4,390,192; 4,423,885; 3,790,188; and 3,986,726.

The U.S. Pat. No. De. 243,000 indicates a gooseneck type trailer hitch conversion structure for the securement to an associated trailer.

The instant invention attempts to overcome deficiencies of the prior art by providing for a rigid integrally mounted and secure structure arranged for the accommodation of tongue weights and directing the tongue weights onto a fifth wheel type arrangement in a tow vehicle and in this respect, the present invention substantially fulfills this need.

SUMMARY OF THE INVENTION

In view of the foregoing disadvantages inherent in the known types of gooseneck hitch apparatus now present in the prior art, the present invention provides a gooseneck hitch apparatus to secure a bumper hitch type trailer and its mounting to a fifth wheel type arrangement in a gooseneck type arrangement. As such, the general purpose of the present invention, which will be described subsequently in greater detail, is to provide a new and improved gooseneck hitch apparatus which has all the advantages of the prior art gooseneck hitch apparatus and none of the disadvantages.

To attain this, the present invention provides a gooseneck hitch structure arranged in accommodating a trailer with a conventional bumper hitch to a gooseneck type mount in a "fifth wheel" arrangement relative to an associated tow vehicle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved gooseneck hitch apparatus which has all the advantages of the prior art gooseneck hitch apparatus and none of the disadvantages.

It is another object of the present invention to provide a new and improved gooseneck hitch apparatus which may be easily and efficiently manufactured and marketed.

It is a further object of the present invention to provide a new and improved gooseneck hitch apparatus which is of a durable and reliable construction.

An even further object of the present invention is to provide a new and improved gooseneck hitch apparatus which is susceptible of a low cost of manufacture with regard to both materials and labor, and which accordingly is then susceptible of low prices of sale to the consuming public, thereby making such gooseneck hitch apparatus economically available to the buying public.

Still yet another object of the present invention is to provide a new and improved gooseneck hitch apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic view of a modified ball receiving tube structure.

FIG. 6 is an orthographic cross-sectional illustration of the structure as indicated in FIG. 5.

DESCRIPTION OF THE PREFERRED EMBODIMENT

Figure 1:
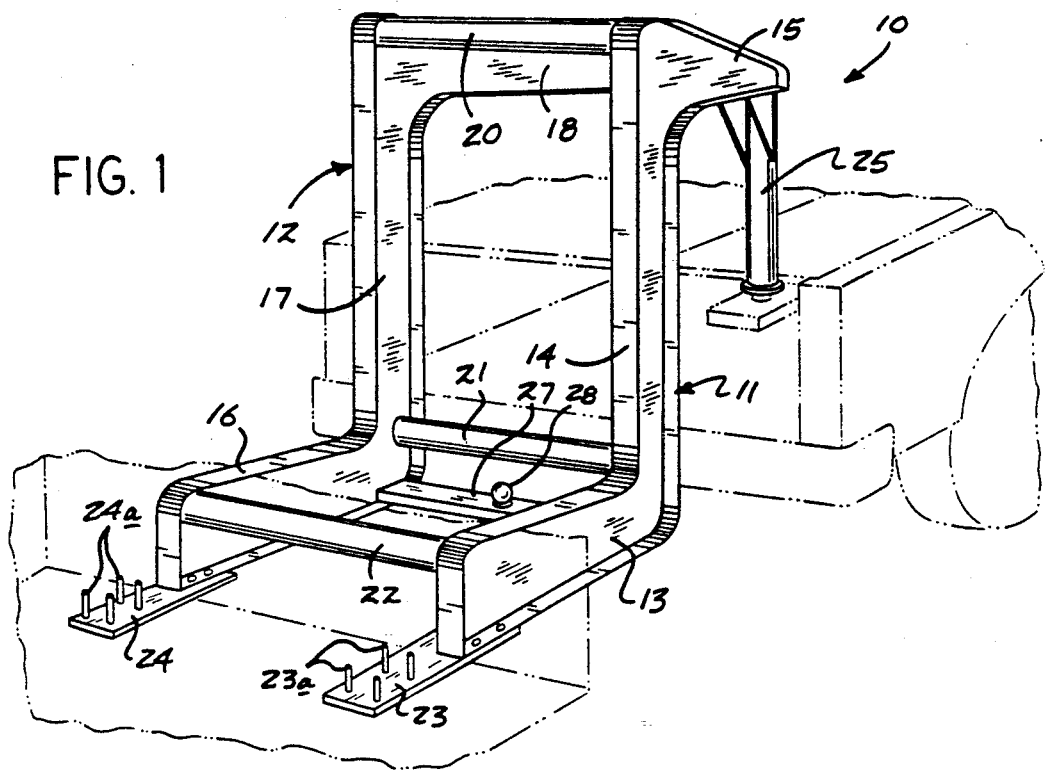
FIG. 1 is an isometric illustration of the invention.
Figure 2:
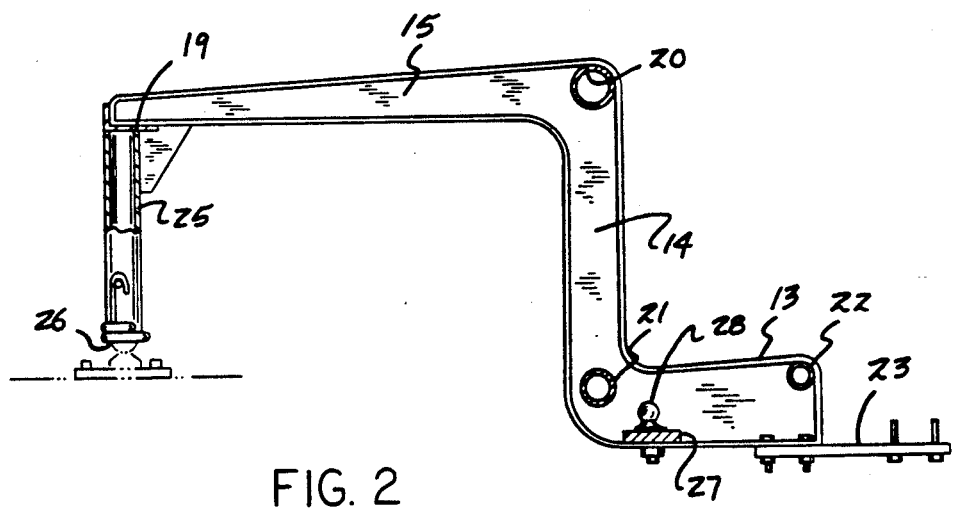
FIG. 2 is an orthographic cross-sectional illustration of the invention.
Figure 3:
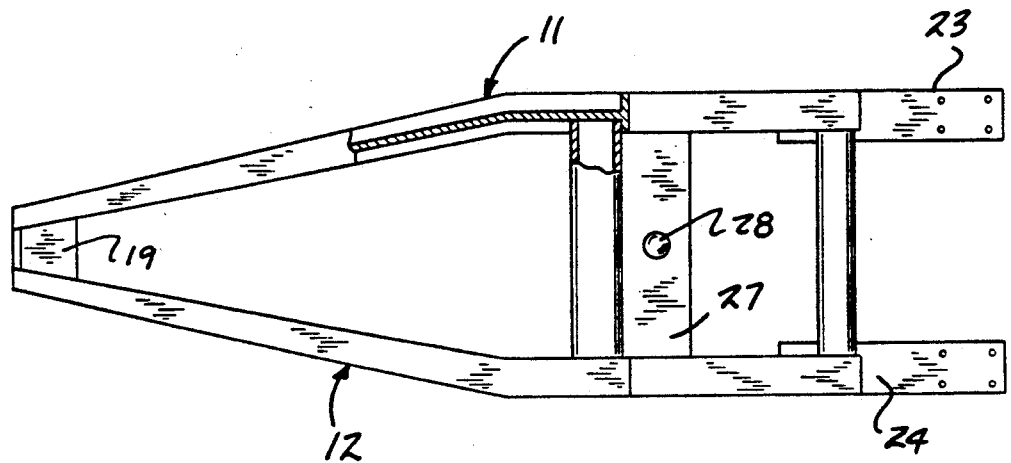
FIG. 3 is an orthographic top view of the invention.
Figure 4:
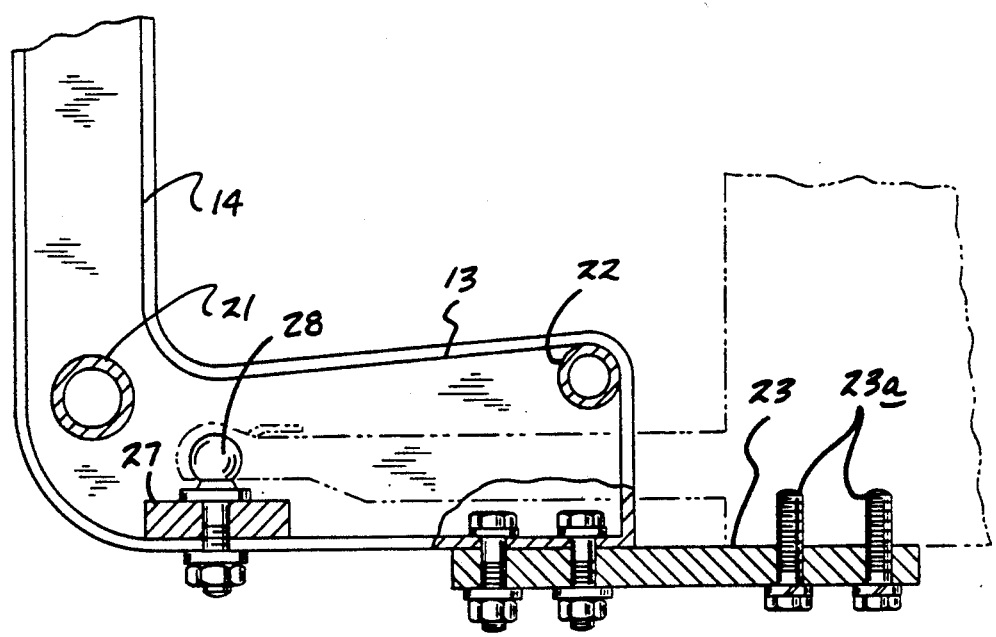
FIG. 4 is an enlarged orthographic view of the mounting plate structure relative to the trailer hitch of the invention.

With reference now to the drawings, and in particular to FIGS. 1 to 8 thereof, a new and improved gooseneck hitch apparatus embodying the principles and concepts of the present invention and generally designated by the reference numeral 10 will be described.

More specifically, the gooseneck hitch apparatus 10 of the instant invention essentially comprises first and second respective lateral beams 11 and 12 that are arranged in a parallel, spaced, and coextensive relationship relative to one another, with the first beam 11 having respective first beam first, second, and third legs 13, 14, and 15, with the first beam first leg 13 orthogonally oriented relative to a lowermost end of the first beam second leg, with the uppermost end of the first beam second leg orthogonally and integrally mounted to the first beam third leg 15. In a similar manner, the second beam 12 includes second beam first, second, and third legs 16, 17, and 18 respectively mounted together in a mirror image relationship relative to the respective first beam first, second, and third legs 13, 14, and 15. A first cross brace 19 is orthogonally directed between the first and second beam first legs 13 and 16, with a second cross brace 20 parallel to the first cross brace integrally mounted between the first and second beams 11 and 12 in an orthogonal relationship intersecting the first beam at the intersection of the first beam second and third legs, and intersecting the second beam at the intersection of the second beam second and third legs. A third cross brace 21 parallel to the first and second cross braces integrally and orthogonally joins the first beam at the intersection of the first beam first and second legs, and integrally and orthogonally joins the second beam at the intersection of the second beam first and second legs. A fourth cross brace 22 integrally and orthogonally extends between the first and second beam first legs. A first mounting plate 23 projects beyond the first beam first leg longitudinally aligned therewith, with a second mounting plate 24 integrally and longitudinally aligned with the second beam first leg, with the first and second mounting plates having respective first and second mounting plate fasteners 23a and 24a respectively for securement to an associated trailer, as indicated in the FIGS. 1 and 4 for example. A fifth cross brace 27 positioned between the third and fourth cross braces in a parallel relationship includes a fifth cross brace hitch ball 28 for accommodating a bumper hitch of an associated trailer structure. A ball receiving tube 25 is integrally and orthogonally mounted medially of the first cross brace 19 extending in a spaced parallel relationship relative to the first and second beam second legs. A latching structure 29 (see FIG. 5) may be employed for the latching of the "fifth wheel" hitch ball within the associated tow vehicle, as indicated in the FIGS. 1 and 5.

The FIGS. 5 and 6 indicate the use of a modified ball receiving tube 25, having a first tube 30 that extends from and is fixed in an orthogonal relationship relative to the first cross brace 19 received within a second tube 31 in a telescoping relationship, such that the first tube 30 includes a row of first tube apertures 32 cooperative with a latch rod 36 directed through the second tube reciprocatably mounted orthogonally to the second tube in a latch rod housing 37 capturing a housing spring 38 between the latch rod and the second tube to bias the latch rod 30 into one of said apertures 32. A second tube intermediate web 33 is arranged in a facing relationship relative to a first tube socket 34 capturing a spring member 35 therebetween to effect a biasing of the first tube relative to the second tube in a spaced relationship.

Figure 7:
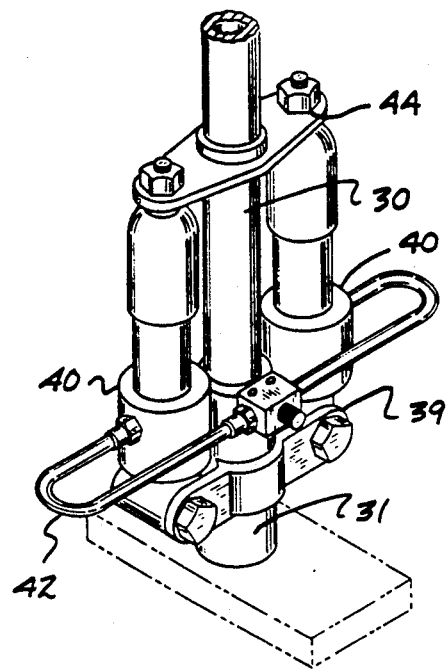
FIG. 7 is an isometric illustration of a further modified ball receiving tube structure.
Figure 8:
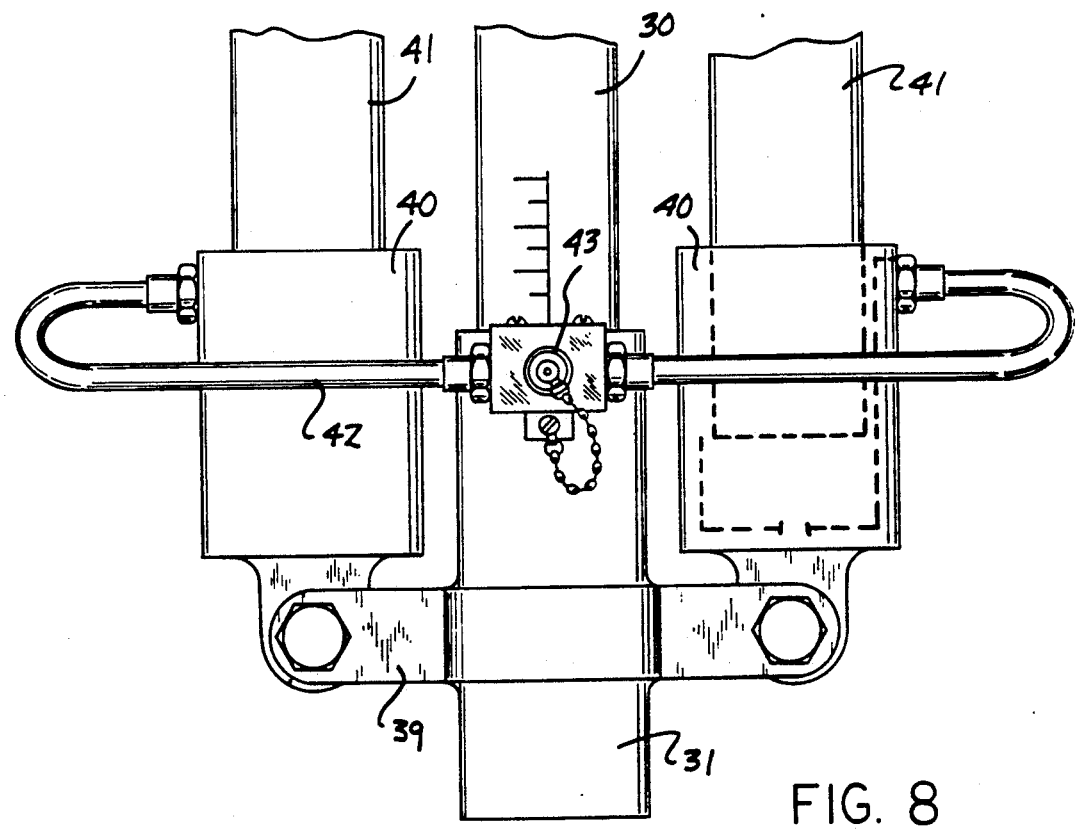
FIG. 8 is an enlarged orthographic view of the ball receiving tube structure indicated in FIG. 7.

The FIGS. 7 and 8 indicate pneumatic means to assist in the separation and leveling of the first tube relative to the second tube relative to trailer leveling and the like, such that additionally, a first mounting collar 39 is mounted to the second tube spaced from and parallel a second mounting collar 44 mounted parallel to the first mounting collar, with the second mounting collar fixedly secured to the first tube 30, such that a plurality of pneumatic expansion cylinders 40 are mounted to the first collar telescopingly receiving piston bodies 41 that are expandable relative to the cylinders, such that a pneumatic conduit 42 in pneumatic communication with the expansion cylinders 40 includes a valve 43 to permit the application of pressurized air into the pneumatic conduit 42 to effect separation of the piston rods 41. Further, ease of separation of the first tube relative to the second tube is effected, whereupon the latch rod structure 36, as indicated in the FIGS. 5 and 6, may be employed in addition to or in lieu of the expansion cylinder structure, as illustrated in FIGS. 7 and 8.

It should be noted that, as exemplified in FIG. 8 in phantom, the pneumatic conduit 42 is directed into an associated expansion cylinder 40 directing pressurized air to be impacted upon a lowermost end of an associated piston rod 41 to permit the projection of the piston rod relative to the expansion cylinder 40.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A gooseneck hitch apparatus, comprising,
   a first lateral beam and a second lateral beam, wherein the first lateral beam and the second lateral beam are arranged in a spaced and coextensive relationship relative to one another in a mirror image configuration, such that the first beam includes a first beam first leg orthogonally intersecting a first beam second leg, a first beam third leg orthogonally intersecting said first beam second leg spaced from and parallel the first beam first leg, wherein the first beam second leg includes a second leg first end and a second leg second end, and a second first side and second second side, the first beam first leg intersecting the first beam second leg at the second leg first end and the second leg first side, and the first beam third leg intersecting the first beam second leg at the second leg second side and the second leg second end, the second beam having a second beam first leg parallel and coextensive with the first beam first leg, and a second beam second leg parallel and coextensive with the first beam second leg, and a second beam third leg coextensive with the first beam third leg, a first cross brace extending orthogonally and between the first beam third leg and the second beam third leg, the first cross brace including a ball receiving tube orthogonally and integrally mounted to the first cross brace extending medially of and parallel the first beam second leg and the second beam second leg, and a second cross brace extending between the first beam and the second beam between the first beam first leg and the second beam first leg, wherein the first cross brace is spaced from and parallel the first cross brace, a third cross brace spaced from and parallel the second cross brace extending orthogonally between the first beam second leg and the second beam second leg, and a fourth cross brace extending between the first beam first leg and the second beam first leg, with the fourth cross brace spaced from and parallel the third cross brace, and a fifth cross brace extending orthogonally between the first beam first leg and the second beam first leg, with the fifth cross brace positioned between and parallel the third cross brace and the fourth cross brace, with the fifth cross brace including a fifth cross brace hitch ball positioned medially of the fifth cross brace, and a first mounting plate extending from the first leg longitudinally aligned therewith, and a second mounting plate extending longitudinally of and exteriorly of the second beam first leg, with the first mounting plate including first fasteners, the second mounting plate including second fasteners.

2. An apparatus as set forth in claim 1 wherein the ball receiving tube includes a first tube integrally and orthogonally mounted to the first cross brace, and a second tube telescopingly receiving the first tube, the first tube including a row of first tube apertures, the second tube having a second tube latch rod, and a latch rod housing integrally and orthogonally mounted to the second tube receiving a latch rod reciprocatably therethrough, and a latch rod housing spring captured between the latch rod and the second tube positioned within the latch rod housing to bias the latch rod through one of said first tube apertures.

3. An apparatus as set forth in claim 2 wherein the first tube includes a first tube socket, and the second tube having a second tube intermediate web within the second tube in a facing relationship relative to the first tube socket, and a spring member captured between the first tube socket and the second tube intermediate web to bias the first tube telescopingly from the second tube.

4. An apparatus as set forth in claim 3 wherein the second tube includes a first mounting collar, and the second tube includes a second mounting collar, with the first mounting collar and the second mounting collar arranged in a spaced parallel relationship, and at least one pneumatic expansion cylinder mounted to the first mounting collar, the expansion cylinder having a piston member reciprocatably mounted within the expansion cylinder, and a pneumatic conduit directed into the expansion cylinder, and a valve mounted within the pneumatic conduit for receiving pneumatic pressure directing and effecting separation of the piston rod relative to the expansion cylinder and separation of the first tube relative to the second tube upon pneumatic pressurizing of the pneumatic conduit through the valve.

* * * * *